United States Patent
Krumhar

(10) Patent No.: US 6,432,453 B1
(45) Date of Patent: Aug. 13, 2002

(54) DIETARY SUPPLEMENT CONTAINING GLYCEROL ESTER OF CONJUGATED LINOLEIC ACID AND ROSEMARY EXTRACT CONTAINING CARNOSIC ACID

(75) Inventor: Kim Carleton Krumhar, Carlsbad, CA (US)

(73) Assignee: Metagenics, Inc., San Clemente, CA (US)

( * ) Notice: Subject to any disclaimer, the term of this patent is extended or adjusted under 35 U.S.C. 154(b) by 0 days.

(21) Appl. No.: 09/775,299

(22) Filed: Feb. 1, 2001

Related U.S. Application Data
(60) Provisional application No. 60/228,249, filed on Aug. 26, 2000.

(51) Int. Cl.⁷ .......................... A61K 47/08; A61K 35/78
(52) U.S. Cl. ....................................... 424/725; 424/439
(58) Field of Search ................................ 514/560, 909; 424/725, 439

(56) References Cited

U.S. PATENT DOCUMENTS 4,871,768 A * 10/1989 Bistrian et al. ............. 514/547
6,034,132 A * 3/2000 Remmereit ................. 514/560

* cited by examiner

*Primary Examiner*—David M. Naff
*Assistant Examiner*—Mike Meller
(74) *Attorney, Agent, or Firm*—Knobbe, Martens, Olson & Bear LLP

(57) ABSTRACT

A composition containing a stabilized form of conjugated linoleic acid is described. The conjugated linoleic acid is reacted with glycerol to form an ester, which is much more resistant to oxidation than the acid form of the conjugated linoleic acid. The composition can additionally contain antioxidants, such as rosemary leaf extract, tocopherols, chelating agents, ascorbic acid, the like. The composition can also contain a fatty acid and/or glycerol ingredient. A method for supplementing an individual's diet is also described.

7 Claims, No Drawings

DIETARY SUPPLEMENT CONTAINING GLYCEROL ESTER OF CONJUGATED LINOLEIC ACID AND ROSEMARY EXTRACT CONTAINING CARNOSIC ACID

CROSS-REFERENCE TO RELATED APPLICATIONS

This application claims the benefit of U.S. Provisional Application No. 60/228,249, filed Aug. 26, 2000.

STATEMENT REGARDING FEDERALLY SPONSORED RESEARCH OR DEVELOPMENT

Not applicable.

BACKGROUND OF THE INVENTION

This invention relates to dietary supplements. More particularly, the invention relates to dietary supplements containing conjugated linoleic acid (CLA) in a formulation that protects the CLA from oxidation.

CLA is a naturally occurring group of dienoic derivatives of linoleic acid found in the fat of beef and other ruminants. CLA is reported to have effects on both tumor development and body fat in animal models. In a study designed to further characterize the metabolic effects of CLA, CLA reduced adipose depot weight by 43% to 88%. It was also found that CLA reduced body fat by several mechanisms, including reduced energy intake, increased metabolic rate, and a shift in the nocturnal fuel mix. D. B. West et al., Effects of Dietary Conjugated Linoleic Acid on Body Fat and Energy Metabolism in the Mouse, 275 Am. J. Physiol. R667–672 (1998). In another study, it was found that dietary polyunsaturated fatty acids, specifically CLA, may positively influence the prognosis of prostatic cancer patients, thus opening the possibility of new therapeutic options. A. Cesano et al., Opposite Effects of Linoleic Acid and Conjugated Linoleic Acid on Human Prostatic Cancer in SCID Mice, 18 Anticancer Res. 1429–1434 (1998). In still another study, results were obtained supporting the view that CLA mitigates the food-induced allergic reaction. M. Sugano et al., Conjugated Linoleic Acid Modulates Tissue Levels of Chemical Mediators and Immunoglobulins in Rats, 33 Lipids 521–527 (1998).

Compared to previous generations, Americans are deficient in CLA because of lower consumption of red meat and butter fat, and because changes in cattle-feeding practices have decreased CLA content in meat and milk. For optimal CLA production, cows should graze on grass instead of being artificially fattened in feed lots. The meat of grass-fed cows contains up to four times as much CLA as meat from feed-lot cows. Today's dairy products have only about one-third the amount of CLA they had before 1960.

One big reason for rising levels of obesity in America could be CLA deficiency. As briefly reviewed above, several animal studies showed that adding CLA to the diet resulted in leaner, more muscular bodies. A pioneering Norwegian human study found that CLA-supplemented subjects lost up to 20% of their body fat in three months without changing their diet, while the control subjects on the average gained a slight amount of body fat during the same period.

CLA has also been shown to have antioxidant properties and to prevent muscle wasting (an anti-catabolic effect). CLA became popular with muscle builders because of its ability to improve the transport of glucose, fatty acids, and protein to the muscle tissue. Part of CLA's effectiveness in preventing obesity may lie in its ability to act as a potent insulin sensitizer, thus lowering insulin resistance and, consequently, insulin levels. K. L. Houseknecht et al., Dietary Conjugated Linoleic Acid Normalizes Impaired Glucose Tolerance in the Zucker Diabetic Fatty fa/fa Rat, 244 Biochem. Biophys. Res. Commun. 678–682 (1998). Since elevated insulin is the chief pro-obesity agent, it is enormously important to keep insulin within the normal range. By activating certain enzymes and enhancing glucose transport into cells, CLA acts to lower blood sugar levels and normalize insulin levels. Thus, besides being anti-atherogenic and anti-carcinogenic, CLA is also anti-diabetogenic. That is, it helps prevent adult-onset diabetes, characterized by insulin resistance. If recent animal results are corroborated, CLA may prove to be important not only in the prevention of diabetes, but also as a new therapy for adult-onset diabetes, aimed at lowering insulin resistance.

Still further, CLA has been found to stimulate the production of lymphocytes and of interleukin-2 and to increase the levels of certain immunoglobulins while lowering the release of immunoglobulin E associated with allergies. Improved immune function resulting from CLA can also be postulated on the basis of its ability to lower the production of immunosuppressive compounds, such as leukotrienes and series II prostaglandins and to improve insulin sensitivity (elevated insulin leads to immunosuppression).

K. N. Lee et al., Conjugated Linoleic Acid and Atherosclerosis in Rabbits, 108 Atherosclerosis 19–25 (1994), and R. J. Nicolosi et al., Dietary Conjugated Linoleic Acid Reduces Plasma Lipoproteins and Early Aortic Atherosclerosis in Hypercholesterolemic Hamsters, 22 Artery 266–277 (1997), showed that CLA lowers cholesterol and triglycerides and helps to keep arteries clean. More specifically, CLA added to the diet markedly lowers total and LDL cholesterol, lowers the LDL to HDL ratio, lowers the total cholesterol to HDL ratio, and lowers serum triglyceride levels. On autopsy, the aortas of CLA-supplemented rabbits showed less atherosclerotic plaque than controls. It is not cholesterol per se, but oxidized cholesterol that is harmful to blood vessels. Thus, CLA's antioxidant properties may play a role in its ability to help keep blood vessels clean.

The discovery that CLA possesses peroxisome proliferator-activated receptor (PPAR) alpha and gamma activating activity was a key to understanding the mechanism responsible for its apparent lipid lowering, anabolic, and antidiabetic properties in animals and humans, and established this lipid as a strong candidate for intensive development as a future non-drug antidiabetic, lipid lowering, and anabolic agent for dietary supplements, foods, and pharmaceutical use.

Unfortunately, commercially available CLA, in free fatty acid form, has until now been unsuitable for shelf-stable dietary supplements and foods due to the extreme instability of CLA free fatty acids to oxidation. A. Zhang & Z. Y. Chen, Oxidative Stability of Conjugated Linoleic Acids Relative to Other Polyunsaturated Fatty Acids, 74 J. Am. Oil Chem. Soc. 1611–1613 (1997). In fact, previous studies have shown the half-life of CLA as a free fatty acid is only 7 hours at 75° C. or 14 days at 25° C., which is significantly less than that of free linoleic, linolenic, and arachidonic acids, which are themselves highly unstable to oxidation. K. Eulitz et al., Oxidation of Conjugated Linoleic Acid, in 1 Advances in Conjugated Linoleic Acid Research 55–63 (M. P. Yurawecz et al., eds., AOCS Press, Champaign, Ill., 1999).

Many CLA products in the U.S. and international markets have been evaluated and shown to be rancid and inedible at or before their stated shelf-life due to the presence of decomposition products from lipid oxidation, including lipid hydroperoxides, aldehydes, ketones, carboxylic acids, and other hydrocarbons resulting from the free radical decomposition of peroxidized CLA. Since many of these products are undesirable from an organoleptic standpoint and are also toxic, it is highly desirable and commercially valuable to develop and commercialize technology capable of maintaining CLA in its natural or reduced form for extended periods of time in capsules, powders, foods, and beverages.

Peroxides are formed in the early stages of lipid oxidation from the reaction of oxygen with unsaturated fats in the presence of catalyst, usually a divalent metal ion like iron or copper. Lipid peroxides are highly unstable and reactive and decompose spontaneously or combine with other organic compounds to form new compounds that are characteristic of a particular lipid that has been subject to oxidation.

Until now, it has not been recognized that small quantities of these peroxides, including hydrogen peroxide, can have a significant adverse impact on insulin sensitivity and glucose control in susceptible individuals. Y. M. Janssen-Heininger et al., Cooperativity between Oxidants and Tumor Necrosis Factor in the Activation of Nuclear Factor (NF)-kappaB: Requirement of Ras/mitogen-activated Protein Kinases in the Activation of NF-kappaB by Oxidants, 20 Am. J. Respir. Cell. Mol. Biol. 942–952 (1999). New research evidence indicates that reactive oxidation products, including peroxides, induce oxidative stress in humans and animals and are contra-indicated when other risk factors for the development of type 2 diabetes are present. According to recent research, oxidative stress, and hydrogen peroxide in particular, can play a role in accelerating the development of underlying pathology that leads to increased insulin resistance, deterioration of glycemic control, and development of overt type 2 diabetes with dietary intakes of hydrogen peroxide as low as 500 mM. L. L. Hansen et al., Insulin Signaling Is Inhibited by Micromolar Concentrations of $H_2O_2$. Evidence for a Role of $H_2O_2$ in Tumor Necrosis Factor Alpha-Mediated Insulin Resistance, 274 J. Biol. Chem. 25078–25084 (1999); D. W. Laight et al., Pro-oxidant Challenges In Vivo Provokes the Onset of NIDDM in the Insulin Resistant Obese Zucker Rat, 128 Br. J. Pharmacol. 269–271 (1999).

The impact of oxidative stress mechanism in the pathogenesis of diabetes has been thus far unrecognized and may be so important that development of polyunsaturated fatty acid products like CLA for diabetes prevention and management without taking lipid stability into consideration may reduce the effectiveness of the product or even promote acceleration of underlying pathology.

It is therefore crucial that technology be defined and commercialized for CLA products that will produce greater CLA stability and inhibit the formation of lipid peroxides for extended periods of time in various forms of dietary supplements, foods, and drug compositions and thus improve the bioavailability of the bioactive polyunsaturated lipid isomers in CLA-containing formulas.

In view of the foregoing, it will be appreciated that providing compositions and methods for stabilizing CLA in dietary supplements, foods, and drugs would be a significant advancement in the art.

BRIEF SUMMARY OF THE INVENTION

It is an object of the present invention to provide compositions and methods for stabilizing CLA in dietary supplements, foods, and drugs.

It is also an object of the invention to provide a method for inhibiting or preventing oxidation of CLA for use in dietary supplements, foods, and drugs.

It is another object of the invention to provide a dietary supplement containing CLA formulated such that oxidation of the CLA is inhibited or prevented.

These and other objects can be addressed by providing a dietary supplement comprising a mixture of a glycerol ester of conjugated linoleic acid and an antioxidant ingredient. This ester can be a monoglyceride, diglyceride, triglyceride, or mixtures thereof. The antioxidant ingredient is preferably a member selected from the group consisting of rosemary (*Rosmarinus officinalis*) leaf extract, tocopherols, ascorbic acid, chelating agents, alpha lipoic acid, BHA, BHT, TBHQ, ascorbyl palmitate, ascorbyl-6-gammalinolenic acid, ascorbyl-6-conjugated linoleic acid, ascorbyl-6-dihomogammalinolenic acid, and mixtures thereof. Such chelating agents can include EDTA, citric acid, and mixtures thereof. In another preferred embodiment of the invention the dietary supplement further comprises a fatty acid, preferably a 10–22 carbon fatty acid or mixture thereof, and most preferably a member of the group consisting of stearic acid, oleic acid, linoleic acid, linolenic acid, palmitic acid, lauric acid, and mixtures thereof.

Another preferred embodiment of the invention comprises a method for supplementing an individual's diet comprising administering an effective amount of a dietary supplement comprising mixture of a glycerol ester of conjugated linoleic acid and an antioxidant ingredient. In a preferred embodiment of the invention such effective amount comprises about 1–100 mg of conjugated linoleic acid per kg of body weight.

DETAILED DESCRIPTION

Before the present compositions and methods for stabilizing CLA in dietary supplements, foods, and drugs are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to a composition containing "a fatty acid" includes a mixture of two or more of such fatty acids, reference to "an antioxidant" includes reference to one or more of such antioxidants, and reference to "an ester" includes reference to a mixture of two or more of such esters.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of."

As used herein, "consisting of" and grammatical equivalents thereof exclude any element, step, or ingredient not specified in the claim.

As used herein, "consisting essentially of" and grammatical equivalents thereof limit the scope of a claim to the specified materials or steps and those that do not materially affect the basic and novel characteristic or characteristics of the claimed invention.

As used herein, "effective amount" means an amount of a dietary supplement that is nontoxic but sufficient to provide the desired effect and performance at a reasonable benefit/risk ratio attending any such dietary supplement. An effective amount of an antioxidant ingredient is an amount sufficient to measurably inhibit or reduce oxidation of CLA.

As used herein, "BHT" means butylated hydroxytoluene, "BHA" means butylated hydroxyanisole, "TBHQ" means tertiary-butyl-hydroquinone, and "EDTA" means ethylenediaminetetraacetic acid, salts thereof, and mixtures thereof.

In its most basic formulation, the present invention comprises a mixture of cis-9, trans-11 conjugated linoleic acid and trans-10, cis-12 conjugated linoleic acid randomly esterified to glycerol and an effective amount of an antioxidant ingredient. The glycerides resulting from esterification of CLA with glycerol can be mono-, di-, or tri-glycerides, or mixtures thereof, but triglycerides are preferred. It is also within the scope of the invention to use glycerides of cis-9, trans-11 CLA or of trans-10, cis-12 CLA, but mixtures of the two isomers are more readily available. The esters can be made according to methods well known in the art, such as from acids by reacting CLA with glycerol, from acid chlorides or anhydrides by reacting acid chlorides or anhydrides of CLA with glycerol, or from esters by transesterification by reacting an ester of CLA with glycerol. R. T. Morrison & R. N. Boyd, Organic Chemistry 673 ($3^{rd}$ ed. 1973).

The antioxidant ingredient can be an antioxidant or other compound that inhibits the initiation and progression of autoxidation and singlet oxygen reactions of polyunsaturated lipids, and therefore prevents the formation and decomposition of lipid peroxides. Preferred such antioxidants for inhibiting the oxidation of the esterified CLA include rosemary (*Rosmarinus officinalis*) leaf extract, tocopherols, ascorbic acid, chelating agents, alpha lipoic acid, and the like, and mixtures thereof. An especially preferred formulation of rosemary leaf extract is sold under the registered trademark RoseOx® (Hauser, Inc.).

The composition can also comprise other fatty acids, such as oleic, stearic, palmitic, behenic, lauric, linoleic, and linolenic acids, and mixtures thereof. Traces of other 10–22 carbon fatty acids can also be present in the formulation, such as fatty acids naturally found in corn, soy, canola, sunflower, safflower, cottonseed, wheat germ, and olive oils and the like.

The composition can also comprise glycerol as a diluent, stabilizer, and/or formulation aid.

Table 1 sets out ranges in percent by weight of these ingredient that can be present in preferred and more preferred formulations of the present invention.

TABLE 1

| Component | Preferred | More Preferred |
|---|---|---|
| Glycerol ester of CLA | 40–95 | 50–90 |
| Antioxidant ingredient | 0.5–60 | 1–50 |
| Fatty acid | 0–59.5 | 1–50 |
| Glycerol | 0–10 | 2–10 |

The 40 to 95% of glycerol ester of conjugated linoleic acid in Table 1 provides about 32 to 91% by weight of conjugated linoleic acid in a formulation.

Table 2 sets out ranges of ingredients that can be incorporated into illustrative formulations of stabilized CLA products according to the present invention.

TABLE 2

| Component | Theoretical % (w/w) | Actual % (w/w of fatty acid) | Actual % (w/w of formula) |
|---|---|---|---|
| CLA ester (mixed isomer) | 40–95 | 75 | 72.82 |
| Stearic acid | 0–5 | <1 | <1 |
| Oleic acid | 0–20 | <20 | 10 |
| Linoleic acid | 0–10 | <4 | <3.89 |
| Linolenic acid | 0–5 | <1 | <1 |
| Palmitic acid | 0–5 | <1 | <1 |
| Lauric acid | 0–5 | <1 | <1 |
| Other fatty acids | 1–10 | <1 | <1 |
| Glycerol | 2–10 | 6 | 5.83 |
| Rosemary extract | 0.5–15 | na | 2.875 |
| Alpha-tocopherol | 0.05–5 | na | na |
| Mixed tocopherols | 0.05–5 | na | na |
| Ascorbic acid | 0.01–20 | na | na |
| Citric acid | 0.01–1 | na | na |
| BHA | 0.001–0.02 | na | na |
| BHT | 0.001–0.02 | na | na |
| TBHQ | 0.001–0.02 | na | na |
| EDTA | 0.001–0.1 | na | na |
| Rice tocotrienols | 0.001–0.2 | na | na |
| Palm tocotrienols | 0.001–0.2 | na | na |
| Ascorbyl palmitate | 0.001–0.2 | na | na |
| Ascorbyl-6-gammalinolenic acid (ascorbyl GLA) | 0.1–20 | na | na |
| Ascorbyl-6-conjugated linoleic acid (ascorbyl CLA) | 0.1–20 | na | na |
| Ascorbyl-6-dihomogammalinolenic acid (ascorbyl DGLA) | 0.1–20 | na | na |
| Alpha-lipoic acid | 0.5–20 | na | na |
| Total | | 97.125 | 100 | na = not applicable

Table 3 sets out the composition of an illustrative stabilized CLA product according to the present invention.

TABLE 3

| Component | % (w/w) of fatty acid | % (w/w) of total | weight, mg/capsule |
|---|---|---|---|
| CLA ester (mixed isomers) | 75 | 72.84 | 500 |
| Stearic acid | <1 | <1 | <7 |
| Oleic acid | <10 | <9 | <60 |
| Linoleic acid | <4 | <3.89 | <26 |
| Linolenic acid | <1 | <1 | <7 |
| Palmitic acid | <1 | <1 | <7 |
| Lauric acid | <1 | <1 | <7 |

TABLE 3-continued

| Component | % (w/w) of fatty acid | % (w/w) of total | weight, mg/capsule |
|---|---|---|---|
| Other fatty acids | <1 | <1 | <7 |
| Glycerol | 6 | 5.83 | 40 |
| Rosemary leaf extract (≧6% carnosic acid) | | 2.875 | 20 |
| Total | 97.125 | 100 | 681 |

Table 4 sets out the composition of another illustrative stabilized CLA product according to the present invention.

TABLE 4

| Component | % (w/w) of fatty acid | % (w/w) of total | Weight, mg/capsule |
|---|---|---|---|
| CLA ester (mixed isomers) | 75 | 70.405 | 500 |
| Stearic acid | <1 | <1 | 7 |
| Oleic acid | <10 | <1 | 60 |
| Linoleic acid | <4 | <3.89 | 26.5 |
| Linolenic acid | <1 | <1 | 7 |
| Palmitic acid | <1 | <1 | 7 |
| Lauric acid | <1 | <1 | 7 |
| Other fatty acids | <1 | <1 | 7 |
| Glycerol | 6 | 5.83 | 39.7 |
| Rosemary leaf extract (≧6% carnosic acid) | | 2.675 | 18.22 |
| Alpha-tocopherol | 0.05–5 | 0.2 | 12.5 (18.2 IU) |
| Mixed tocopherols | 0.05–5 | na | na |
| Ascorbic acid | 0.01–20 | na | na |
| Citric acid | 0.01–1 | 1 | 7 |
| BHA | 0.001–0.02 | na | na |
| BHT | 0.001–0.02 | na | na |
| TBHQ | 0.001–0.02 | na | na |
| Rice tocotrienols | 0.001–0.2 | na | na |
| Palm tocotrienols | 0.001–0.2 | na | na |
| Ascorbyl palmitate | 0.001–15 | 5 | 34 |
| Ascorbyl-6-gammalinolenic acid (ascorbyl GLA) | 0.1–20 | na | na |
| Ascorbyl-6-conjugated linoleic acid (ascorbyl CLA) | 0.1–20 | na | na |
| Ascorbyl-6-dihomogammalinolenic acid (ascorbyl DGLA) | 0.1–20 | na | na |
| Alpha-lipoic acid | 0.5–20 | 5 | 34 |
| Total | | 100 | 766.6 | na = not applicable

Table 5 sets out the composition of still another illustrative stabilized CLA product according to the present invention.

TABLE 5

| Component | % (w/w) of fatty acid | % (w/w) of total | Weight, mg/capsule |
|---|---|---|---|
| CLA ester (mixed isomers) | 75 | 70.405 | 500 |
| Stearic acid | <1 | <1 | 7 |
| Oleic acid | <10 | <1 | 60 |
| Linoleic acid | <4 | <3.89 | 26.5 |
| Linolenic acid | <1 | <1 | 7 |
| Palmitic acid | <1 | <1 | 7 |
| Lauric acid | <1 | <1 | 7 |
| Other fatty acids | <1 | <1 | 7 |
| Glycerol | 6 | 5.83 | 39.7 |
| Rosemary leaf extract (≧6% carnosic acid) | | 2.675 | 20 |
| Alpha-tocopherol | 0.05–5 | 0.2 | 12 (18 IU) |
| Mixed tocopherols | 0.05–5 | na | na |
| Ascorbic acid | 0.01–20 | na | na |
| Citric acid | 0.01–1 | 1 | 7 |
| BHA | 0.001–0.02 | na | na |
| BHT | 0.001–0.02 | na | na |
| TBHQ | 0.001–0.02 | na | na |
| Rice tocotrienols | 0.001–0.2 | na | na |
| Palm tocotrienols | 0.001–0.2 | na | na |
| Ascorbyl palmitate | 0.001–15 | 5 | 34 |
| Ascorbyl-6-gammalinolenic acid (ascorbyl GLA) | 0.1–20 | na | na |
| Ascorbyl-6-conjugated linoleic acid (ascorbyl CLA) | 0.1–20 | na | na |
| Ascorbyl-6-dihomogammalinolenic acid (ascorbyl DGLA) | 0.1–20 | na | na |
| Alpha-lipoic acid | 0.5–20 | 5 | 34 |
| Total | | 100 | 766.6 | na = not applicable

The composition of the present invention is preferably manufactured in liquid form by mixing the ingredients and then placing them in capsules as is well known in the art. Remington's Pharmaceutical Sciences (15$^{th}$ ed. 1975). The capsules are then packaged in suitable containers. The composition is taken orally, typically with liquid, such as water, milk, fruit juice, or other beverages. The daily dosage of the composition preferably ranges from about 1 to 100 mg of CLA ester per kg of body weight, more preferably from about 5 to 80 mg of CLA ester per kg of body weight, and most preferably from about 7 to 45 mg of CLA ester per kg of body weight. The daily dosage can be ingested in a single serving or divided into various servings and taken at intervals. For example, a preferred daily dosage could be taken by ingesting one or two capsules, each containing 500 mg of CLA ester, one to three times daily.

Other ingredients, such as coloring agents, thickeners (e.g., gelatin), stabilizers, and the like can also be incorporated into the composition for providing their usual advantages.

The subject matter claimed is:

1. A dietary supplement comprising a mixture of a glycerol ester of conjugated linoleic acid and about 0.5 to 60% by weight of rosemary extract containing at least 6% by weight of carnosic acid, wherein said glycerol ester of conjugated linoleic acid provides in said dietary supplement from about 32% to about 91% by weight of the conjugated linoleic acid.

2. The dietary supplement of claim 1 wherein the conjugated linoleic acid is a glycerol ester selected from the group consisting of a monoglyceride, diglyceride, triglyceride, and mixtures thereof.

3. The dietary supplement of claim 1 wherein said conjugated linoleic acid is a member selected from the group consisting of cis-9, trans-11 conjugated linoleic acid; trans-10, cis-12 conjugated linoleic acid; and mixtures thereof.

4. A method for supplementing an individual's diet comprising administering an effective amount of a dietary supplement according to claim 1.

5. The method of claim 4 wherein said ester is a member selected from the group consisting of a monoglyceride, diglyceride, triglyceride, and mixtures thereof.

6. The method of claim 4 wherein said conjugated linoleic acid is a member selected from the group consisting of cis-9, trans-11 conjugated linoleic acid; trans-10, cis-12 conjugated linoleic acid; and mixtures thereof.

7. The method of claim 4 wherein said effective amount of the dietary supplement provides about 1–100 mg of conjugated linoleic acid per kg of body weight.

* * * * *